US012566829B2

(12) United States Patent
Zhang et al.

(10) Patent No.: US 12,566,829 B2
(45) Date of Patent: Mar. 3, 2026

(54) DEVICE ACCESS CONTROL

(71) Applicant: Citrix Systems, Inc., Ft. Lauderdale, FL (US)

(72) Inventors: Hui Zhang, Nanjing (CN); Taoyong Ding, Nanjing (CN); Liang Zhou, Nanjing (CN)

( * ) Notice: Subject to any disclaimer, the term of this patent is extended or adjusted under 35 U.S.C. 154(b) by 736 days.

(21) Appl. No.: 17/851,956

(22) Filed: Jun. 28, 2022

(65) Prior Publication Data

US 2023/0401299 A1 Dec. 14, 2023

Related U.S. Application Data

(63) Continuation of application No. PCT/CN2022/098619, filed on Jun. 14, 2022.

(51) Int. Cl.

| | |
|---|---|
| ***G06F 21/31*** | (2013.01) |
| ***G06F 3/0481*** | (2022.01) |
| ***G06F 3/0484*** | (2022.01) |

(52) U.S. Cl.
CPC .......... *G06F 21/316* (2013.01); *G06F 3/0481* (2013.01); *G06F 3/0484* (2013.01)

(58) Field of Classification Search
CPC .... G06F 21/316; G06F 3/0481; G06F 3/0484; G06F 9/451
See application file for complete search history.

(56) References Cited

U.S. PATENT DOCUMENTS

2007/0300178 A1* 12/2007 McArdle ............... G06F 3/0481 715/802
2014/0032638 A1* 1/2014 Park ......................... G09B 7/02 709/203
2019/0068722 A1* 2/2019 Hart ...................... H04L 67/145
2022/0414601 A1* 12/2022 Shek .................... G06Q 10/103

FOREIGN PATENT DOCUMENTS

JP 2020533669 A * 11/2020 ............. G16H 40/60

* cited by examiner

*Primary Examiner* — Brian Whipple

(57) ABSTRACT

Device access control can be implemented on a protected device to determine, based on a user input to the device, that a timeout threshold has been exceeded and to cause, in response to determining that the timeout threshold has been exceeded, an application graphical user interface (GUI) on the device to remove or blank content, such as text, images, or graphics, from the application window. The removal or blanking of the content can be performed on a window-by-window basis; that is, content is removed only from application windows of applications that are protected by an associated application protection policy. In some examples, the application protection policy can be established by an administrator of a digital workspace within which the protected application executes. Such a digital workspace can be implemented via a type of virtual processing environment that can be accessed via client computing devices.

17 Claims, 8 Drawing Sheets

DEVICE ACCESS CONTROL

BACKGROUND

Nearly all social and economic sectors of the world—both private and public—now rely on various forms of digital technology. As the complexity of computing and data storage systems and the communication networks that interconnect these systems increases, the security risks associated with these systems and networks grow and intensify. These risks include cyberattacks from malicious individuals or entities that seek to steal, manipulate, destroy, or deny access to sensitive information, or to otherwise disrupt critical infrastructure. As a result, innovative security solutions are needed to address evolving threats and other risks.

SUMMARY

One example provides a method of controlling access to a device. The method includes causing, by a processor, a graphical user interface (GUI) of the device to display content in an application window; detecting, by the processor, a first user input to the device; determining, by the processor, that a timeout threshold has been exceeded based on the detected first user input; causing, by the processor and in response to determining that the timeout threshold has been exceeded, the GUI to remove the content from the application window; detecting, by the processor, a second user input to the device; and causing, by the processor and in response to detecting the second user input, the GUI to display the content in the application window. In some examples, the method includes validating, by the processor, a user credential input to the device, wherein causing the GUI to display the content in the application window is further responsive to validating the user credential. In some examples, the method includes receiving, from an access control service, an application protection policy defining that the content is to be removed from the application window in response to determining that the timeout threshold has been exceeded. In some examples, the method further includes receiving, from the access control service, the timeout threshold associated with the application protection policy. In some examples, the method includes disabling, by the processor and responsive to determining that the timeout threshold has been exceeded, a memory dump of a process attached to the application window. In some examples, the method includes stopping, by the processor, a process attached to the application window and/or a browser attached to the application window. In some examples, the content is a first content, the application window is a first application window, and the method includes causing, by the processor, the GUI to display a second content in a second application window while removing the first content from the first application window.

Another example provides a computer program product including one or more non-transitory machine-readable mediums having instructions encoded thereon that when executed by at least one processor cause a process to control access to a device to be carried out. The process includes causing a graphical user interface (GUI) of the device to display content in an application window; detecting a first user input to the device; determining that a timeout threshold has been exceeded based on the detected first user input; causing, responsive to determining that the timeout threshold has been exceeded, the GUI to remove the content from the application window; detecting a second user input to the device; and causing, responsive to detecting the second user input, the GUI to display the content in the application window. In some examples, the process includes validating a user credential input to the device, wherein causing the GUI to display the content in the application window is further responsive to validating the user credential. In some examples, the process includes receiving, from an access control service, an application protection policy defining that the content is to be removed from the application window responsive to determining that the timeout threshold has been exceeded. In some examples, the process further includes receiving, from the access control service, the timeout threshold associated with the application protection policy. In some examples, the process includes disabling, responsive to determining that the timeout threshold has been exceeded, a memory dump of a process attached to the application window. In some examples, the process includes stopping a process attached to the application window and/or a browser attached to the application window. In some examples, the content is a first content, the application window is a first application window, and the process includes causing the GUI to display a second content in the second application window while removing the first content from the first application window.

Yet another example provides a system including a storage and at least one processor operatively coupled to the storage. The at least one processor is configured to execute instructions stored in the storage that when executed cause the at least one processor to carry out a process including causing a graphical user interface (GUI) of the device to display content in an application window; detecting a first user input to the device; determining that a timeout threshold has been exceeded based on the detected first user input; causing, responsive to determining that the timeout threshold has been exceeded, the GUI to remove the content from the application window; detecting a second user input to the device; and causing, responsive to detecting the second user input, the GUI to display the content in the application window. In some examples, the process includes validating a user credential input to the device, wherein causing the GUI to display the content in the application window is further responsive to validating the user credential. In some examples, the process includes receiving, from an access control service, an application protection policy defining that the content is to be removed from the application window responsive to determining that the timeout threshold has been exceeded. In some examples, the process further includes receiving, from the access control service, the timeout threshold associated with the application protection policy. In some examples, the process includes disabling, responsive to determining that the timeout threshold has been exceeded, a memory dump of a process attached to the application window. In some examples, the process includes stopping a process attached to the application window and/or a browser attached to the application window.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Overview

Figure 1:
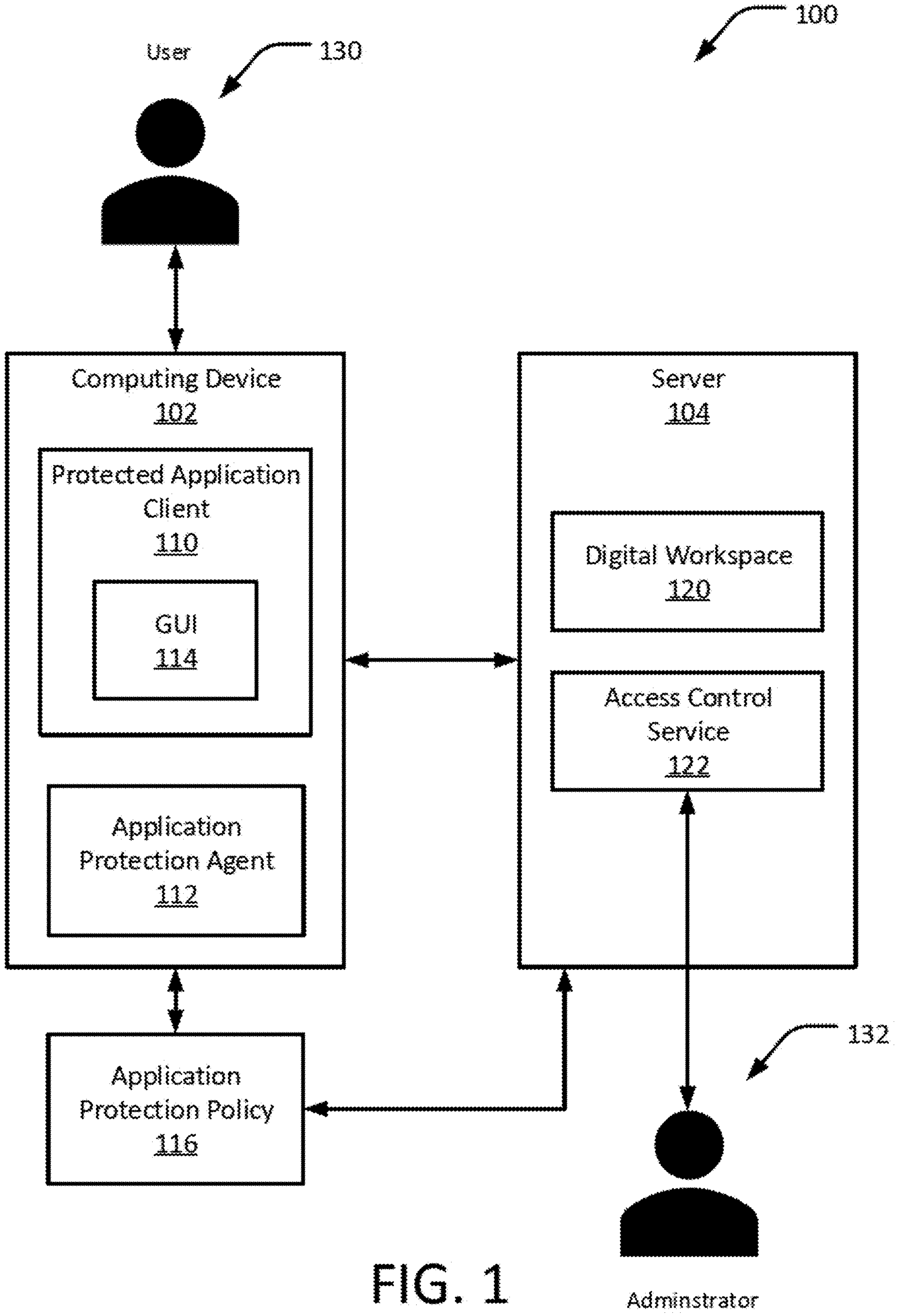
FIG. 1 is a block diagram of a device access control system, in accordance with an example of the present disclosure.

Computer security, also referred to as cybersecurity, includes layers of protection against the unauthorized access to various electronic resources such as hardware, software, and data. For example, data encryption techniques are utilized to prevent unauthorized access to information, while passwords are widely employed to restrict access to various computing resources, including hardware, applications, networks, and data storage. Other forms of access control, such as Citrix Secure Private Access by Citrix Systems, Inc., of Ft. Lauderdale, Florida, enable corporate administrators to protect confidential information in applications, documents, and other resources and prevent data leaks. For instance, Citrix Secure Private Access provides application protection features that blank out or otherwise obfuscate the windows of protected applications when capturing or sharing display screens.

However, it is appreciated that existing security solutions are still insufficient for evolving computing modes. For example, hybrid work environments where users with portable computers, such as laptops and smart phones, can vary from secure office or home spaces to relatively unsecure public spaces, such as parks, coffee shops, and airport terminals, are increasingly commonplace. Hybrid work environments have been increasingly vulnerable to attackers because users can work from virtually anywhere, with any device, and through any network. Even when rigorous security measures are taken, there is still a significant risk of leaking confidential information. For instance, if a laptop or other device is left unattended, however briefly, there is a risk that confidential information displayed on the screen is exposed to a potentially malicious person, or that an authorized person can take control of the device, especially if the device is left unattended in a public area.

Some existing solutions include a screen saver that is designed to blank the screen and lock the device after some period of inactivity, which can be configurable. However, in many instances the timeout is usually relatively long, such as 15 minutes or even longer, to avoid impeding the user too frequently. For personal devices, users may not set any lockout mechanism and corporate administrators may have little to no control over such devices. Therefore, non-trivial computer security issues remain present with current solutions.

To this end, techniques for device access control are disclosed. In some examples, device access control can be implemented on a protected device to determine, based on a user input to the device, that a timeout threshold has been exceeded and to cause, in response to determining that the timeout threshold has been exceeded, an application graphical user interface (GUI) on the device to remove or blank content, such as text, images, or graphics, from the application window. The removal or blanking of the content can be performed on a window-by-window basis; that is, content is removed only from application windows of applications that are protected by an associated application protection policy. In some examples, the application protection policy can be established by an administrator of a digital workspace within which the protected application executes. Such a digital workspace can be implemented via, for example, the Citrix Workspace platform, which is a type of virtual processing environment that can be accessed via client computing devices. In some other examples, the device access control includes disabling, responsive to determining that the timeout threshold has been exceeded, a memory dump of a process attached to the application window and/or stopping a process attached to the application window and/or a browser attached to the application window.

Example Device Access Control System

FIG. 1 is a block diagram of a device access control system 100, in accordance with an example of the present disclosure. The system 100 includes a computing device 102 and a server 104. The computing device 102 is configured to provide at least one protected application client 110 and at least one application protection agent 112. The server 104 is configured to provide a digital workspace 120 and an access control service 122. The computing device 102 and the server 104 can each be in communication with other components of the system 100 using, for example, a local area network, a wide area network, or any type of wired or wireless network.

The protected application client 110 is configured to provide a graphical user interface 114 that permits a user 130 to interact with a protected application and to view content (e.g., text, graphics, images, video, etc.) generated by the protected application. In some examples, the protected application can execute locally within the computing device 102 or remotely from the server 104 via the digital workspace 120. As used herein, the term protected application refers to an application executing or configured to execute on the computing device 102 for which an application protection policy 116 is applied. The application protection policy 116 can, for example, define how content and other data generated by or otherwise associated with the protected application is secured from access or viewing under certain conditions, such as while the application is not in active use or while no user inputs to the computing device 102 are detected. For example, the protected application client 110 can be configured to remove or blank content from the GUI 114 while the protected application is not in active use or while no user inputs are detected after a timeout threshold has expired, per the application protection policy 116. In another example, the application protection agent 112 can be configured to disable process memory dumps and/or stop running processes associated with or attached to the protected application while the protected application is not in active use or while no user inputs are detected after a timeout threshold has expired, per the application protection policy 116. In a virtualized environment, a process that is stopped due to its association/attachment with/to the protected application can be remote from, or virtual to, the computing device 102 (e.g., executing on the server 104).

The digital workspace 120 supports the protected application client 110 executing on the computing device 102. More generally, the digital workspace 120 is a software framework for delivering and managing applications (including the protected application(s)), data, and desktops in a consistent and secure manner across multiple devices and locations. The digital workspace 120 enhances the user experience by streamlining and automating frequently performed tasks, such as browsing web pages, entering data into forms, and retrieving data into applications. The digital workspace allows users to access functionality provided by multiple applications through a common user interface (e.g., the GUI 114), including software-as-a-service (SaaS) applications, web applications, desktop applications, enterprise applications, and proprietary applications. As described in further detail below, the access control service 122 supports certain functions relating to the protected application client 110 and the application protection agent 112, including allowing an administrator 132 to configure the application protection policy 116 and synchronizing the application protection policy 116 between the server 104 and the computing device 102 each time a protected application is launched either in the digital workspace 120 via the protected application client 110 or locally on the computing device 102.

Example Graphical User Interface

Figure 2:
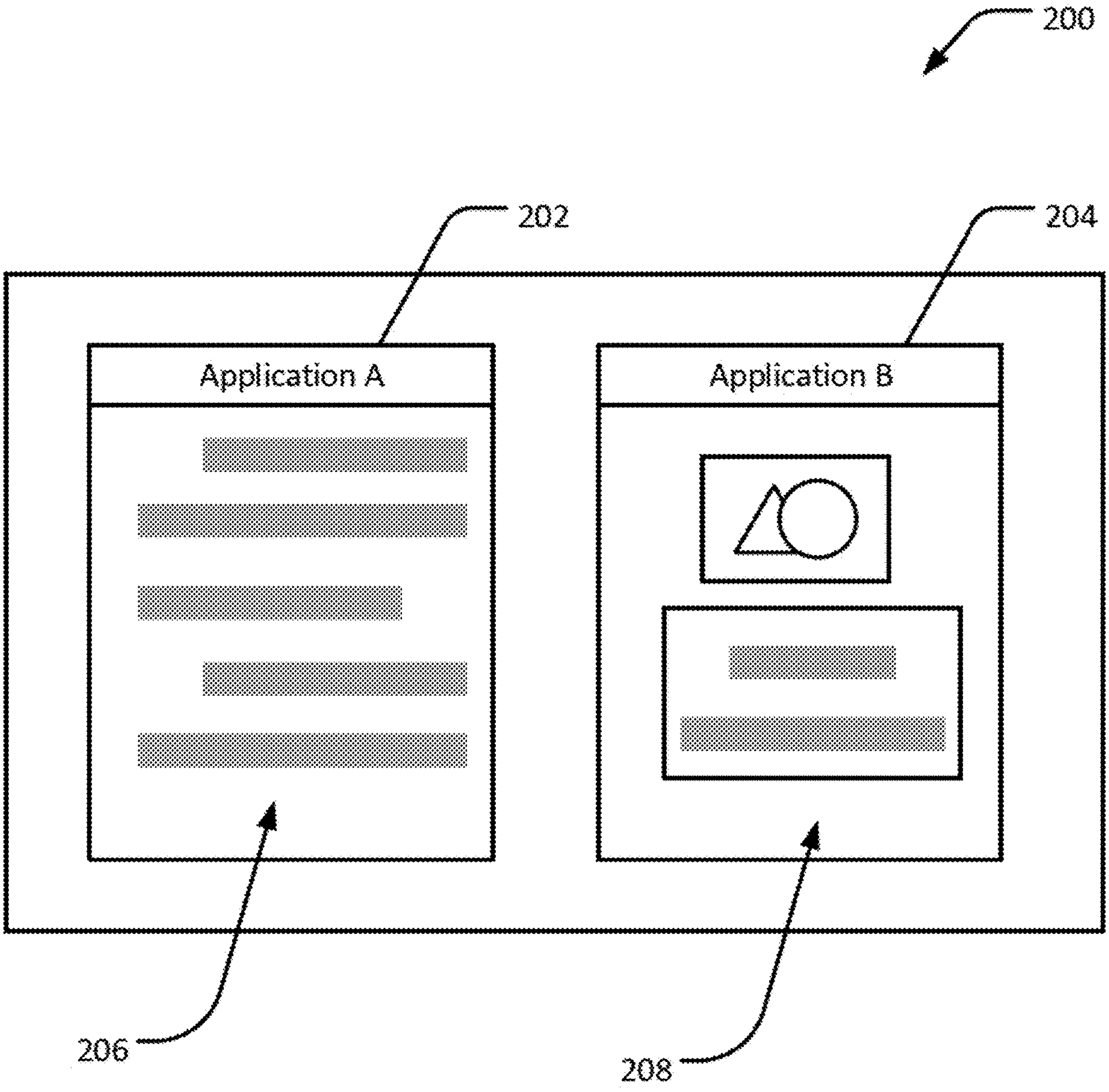
FIG. 2 is a first view of a graphical user interface (GUI) of the device access control system of FIG. 1, in accordance with an example of the present disclosure.

FIG. 2 is a first view of a graphical user interface (GUI) 200, in accordance with an example of the present disclosure. The GUI 200 includes a first application window 202 and a second application window 204. It will be understood that in some other examples the GUI 200 includes only one application window (e.g., the first application window 202), while in some other examples the GUI 200 includes any number of application windows (e.g., the first and second application window 202, 204, and one or more additional application windows). The GUI 200 is configured to display first content 206 in the first application window 202 and second content 208 in the second application window 204. The first content 206 can include, for example, any information or graphics generated by a first application executing on the computing device 102, and the second content 208 can include, for example, any information or graphics generated by a second application executing on the computing device 102, where the first content 206 and the second content 208 are different and the first application and the second application are different. For example, the first application can be a word processor configured to display a word processing document in the first application window 202, where the first content 206 is at least a portion of the word processing document (e.g., a portion of the document that fits within the first application window 202). In another example, the second application can be an image editing application configured to display an image in the second application window 204, where the second content 208 is at least a portion of the image (e.g., a portion of the image that fits within the second application window 204). As will be appreciated, the first and second application windows 202, 204 can display varying content 206, 208 as generated by the first and second applications, respectively.

Figure 3:
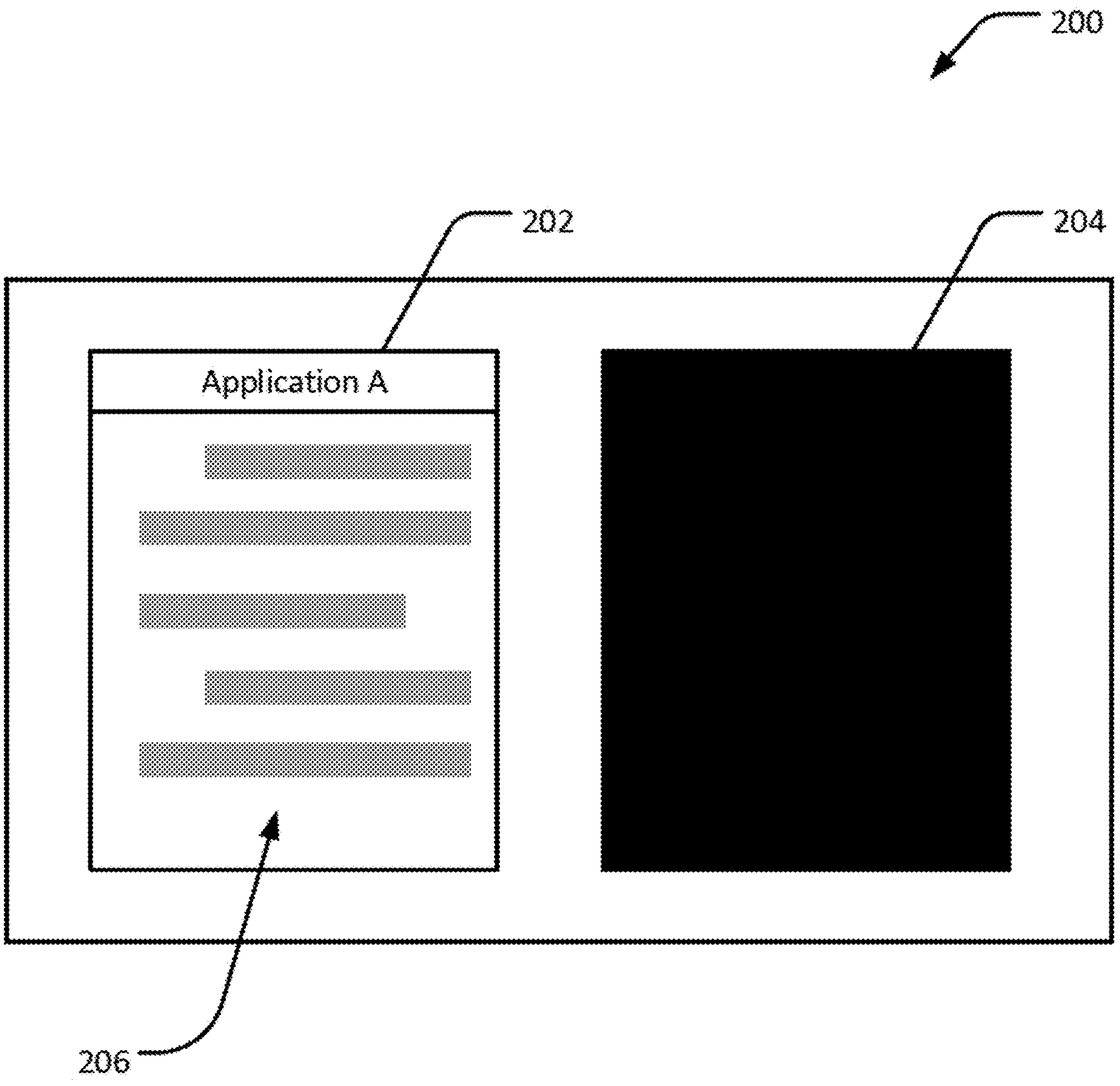
FIG. 3 is a second view of the GUI of FIG. 2, in accordance with another example of the present disclosure.

FIG. 3 is a second view of the graphical user interface (GUI) 200 of FIG. 2, in accordance with another example of the present disclosure. In this example, the GUI 200 is configured to display first content 206 in the first application window 202 and to remove or otherwise prevent display of the second content 208 in the second application window 204, such as by blanking or blacking out the second application window 204 so that no content is visible within that window, even if the second application is otherwise generating the second content 208. The removal or blanking of the second content 208 can occur when a timeout threshold (e.g., 30 seconds, one minute, or any other length of time) from the most recent user input to the computing device 102 is exceeded, such as specified by an application protection policy for the corresponding application. For example, the GUI 200 can remove the second content 208 from the second application window 204 if the user does not press any key on the keyboard, move the mouse, or press any buttons on the mouse within the timeout threshold, while continuing to display the first content 206 in the first application window 202. In this manner, the GUI 200 can remove or blank the content from one or more application windows while continuing to receive input and/or display the content in one or more other application windows; in other words, the GUI 200 does not necessarily remove or blank out all content. Rather, the GUI 200 selectively removes or blanks out content based on the application protection policy for the application associated with the application window, while other application windows continue to display content.

Figure 4:
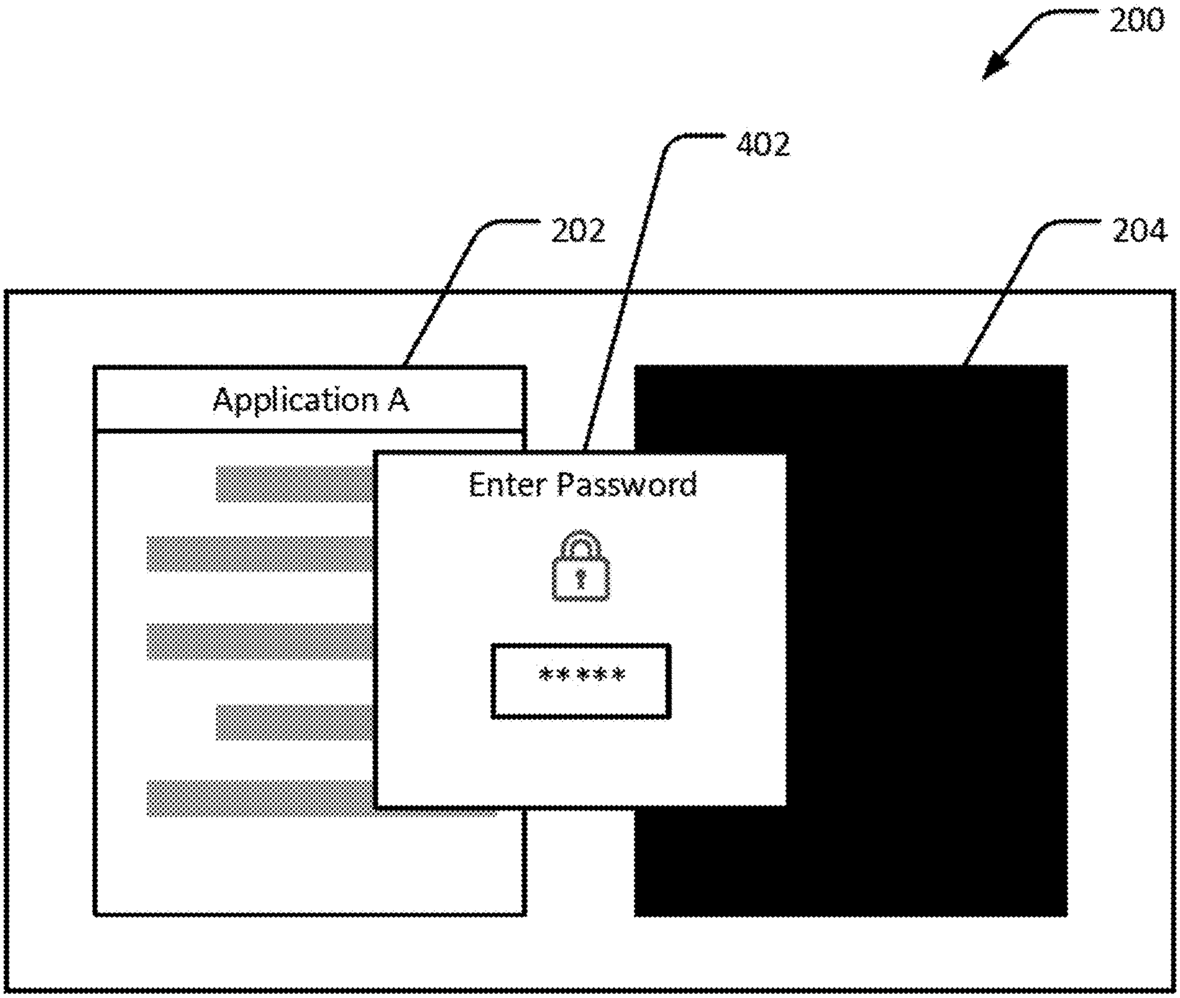
FIG. 4 is a third view of the GUI of FIG. 2, in accordance with another example of the present disclosure.

FIG. 4 is a third view of the graphical user interface (GUI) 200 of FIG. 2, in accordance with another example of the present disclosure. In this example, the GUI 200 is configured to display an interface element 402 configured to receive a user credential (e.g., a dialog box, pop-up window, or other text input field within the GUI 200). For example, if, while the second content (not shown in FIG. 4) is removed or blanked from the second application window 204, a user input is received by the computing device 102, such as a key press, a mouse click, mouse movement, or other user input (in some instances, within the second application window 204 or other portion of the GUI 200), the GUI 200 displays the interface element 402. The user can then enter the user credential, such as a password, passcode, personal identification number (PIN), or another credential into the interface element 402. Upon validation of the credential, the GUI 200 is configured to display the second content 208 in the second application window 204, such as shown in FIG. 2.

Example Device Access Control Processes

Figure 5:
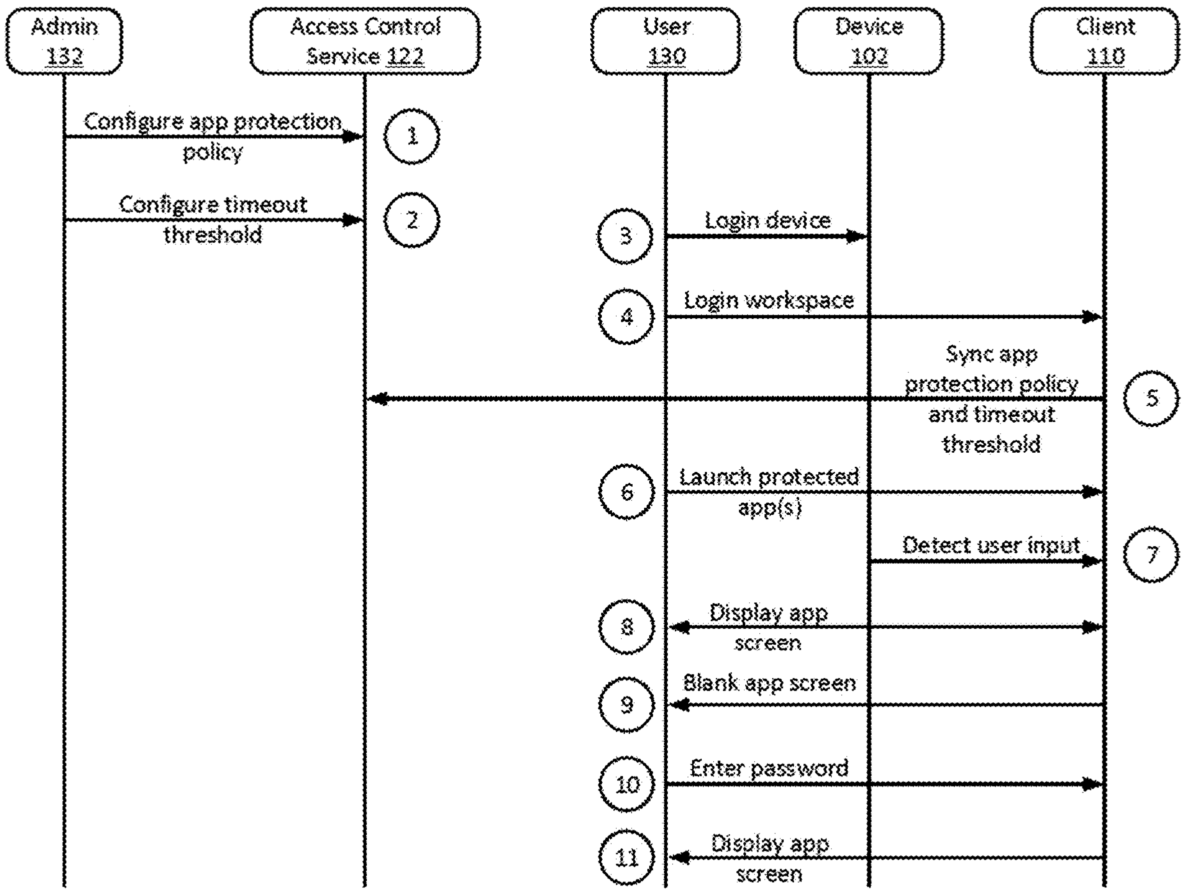
FIG. 5 is a flow diagram of a process for controlling access to a device, in accordance with an example of the present disclosure.

FIG. 5 is a flow diagram of a process for controlling access to a device, in accordance with an example of the present disclosure. As discussed above, access to the computing device 102 can be controlled by, for example, removing or blanking content displayed within the GUI 114 of the computing device 102 while a protected application that generates the content is not in active use. In this context, a protected application is in active use while the user 130 is interacting with the computing device 102 or with the protected application, such as through user inputs such as keystrokes, mouse inputs, touch screen interactions, or any other input detected by the computing device 102 and caused by the user 130, and during a time period after the last such user input was detected by the computing device 102. For example, the protected application can be in active use while the user 130 is typing on the keyboard and for up to one minute after the last key has been pressed. It will be understood that the type of user input can vary depending on the hardware capabilities of the computing device 102 (e.g., for a device with a touch sensitive screen, the user input can include a touch input or a stylus input; for a device with a mouse, the user input can include a mouse movement or a mouse button click; for a device with an infrared (IR) or radio frequency (RF) sensor, the user input can include a signal received from an IR or RF input device, such as a remote control or pointer).

Initially, the administrator 132 configures, via a digital workspace, one or more application ("app") protection policies 116 in an access control service, as indicated at step 1. Each app protection policy 116 defines which applications are protected applications for which the app protection policy 116 applies and a timeout threshold that defines how much time may elapse between a detected user input and a determination that the protected application is not in active use. In some examples, different timeout thresholds can be defined for different protected applications, while in some other examples the same timeout threshold can be defined for all protected applications. In some examples, the timeout threshold(s) is/are configurable by the administrator 132 in the access control service 122, as indicated at step 2.

The user 130 begins to access the computing device 102 by logging in to the computing device 102, as indicated at step 3, and begins to access a protected application in the protected application client 110 executing on the computing device 102 by logging into the protected application client 110, as indicated at step 4. The protected application client 110 then synchronizes the application protection policy 116 and timeout threshold stored on the protected application client 110 with the application protection policy 116 and timeout threshold from the access control service 122, as indicated at step 5. In this manner, the protected application client 110 will receive a current version of the application protection policy 116 and timeout threshold each time the user logs into the protected application client 110. After logging into the protected application client 110, the user 130 then launches one or more protected applications in the protected application client 110, as indicated at step 6. Subsequently, the protected application client 110 detects a user input, as indicated at step 7.

If a user input is detected by the protected application client 110 within the timeout threshold, the protected application client 110 displays content generated by the protected application to the user 130 on the GUI 114 of the computing device 102, as indicated at step 8. However, if no user input is detected by the protected application client 110 within the timeout threshold, the protected application client 110 removes or blanks the content on the GUI 114 of the computing device 102, as indicated at step 9. For example, if the user 130 leaves the computing device 102 for a while, leaving the computing device 102 unattended, the protected application client 110 detects that there is no user input for at least the timeout threshold (e.g., 1 minute) and causes the content to be removed or blanked from the GUI 114. In this manner, any information (including potentially confidential information) is not visible on the GUI 114. In some examples, such as described with respect to FIG. 7, the application protection agent 112 executing on the computing device 102 can block access to a process memory dump to prevent another user of the computing device 102 from attaching to the protected application process to fetch sensitive information.

When a user input is subsequently detected, such as when the user 130 returns to the computing device 102 and begins to use the input device again, the protected application client 110 causes the content generated by the protected application(s) to be displayed on the GUI 114 of the computing device 102, as indicated at step 11. In some examples, to enforce security further, the user 130 inputs a credential, such as a password or PIN, which, if validated by the protected application client 110 or the computing device 102, causes the content to be displayed on the GUI 114, as indicated at step 10.

Figure 6:
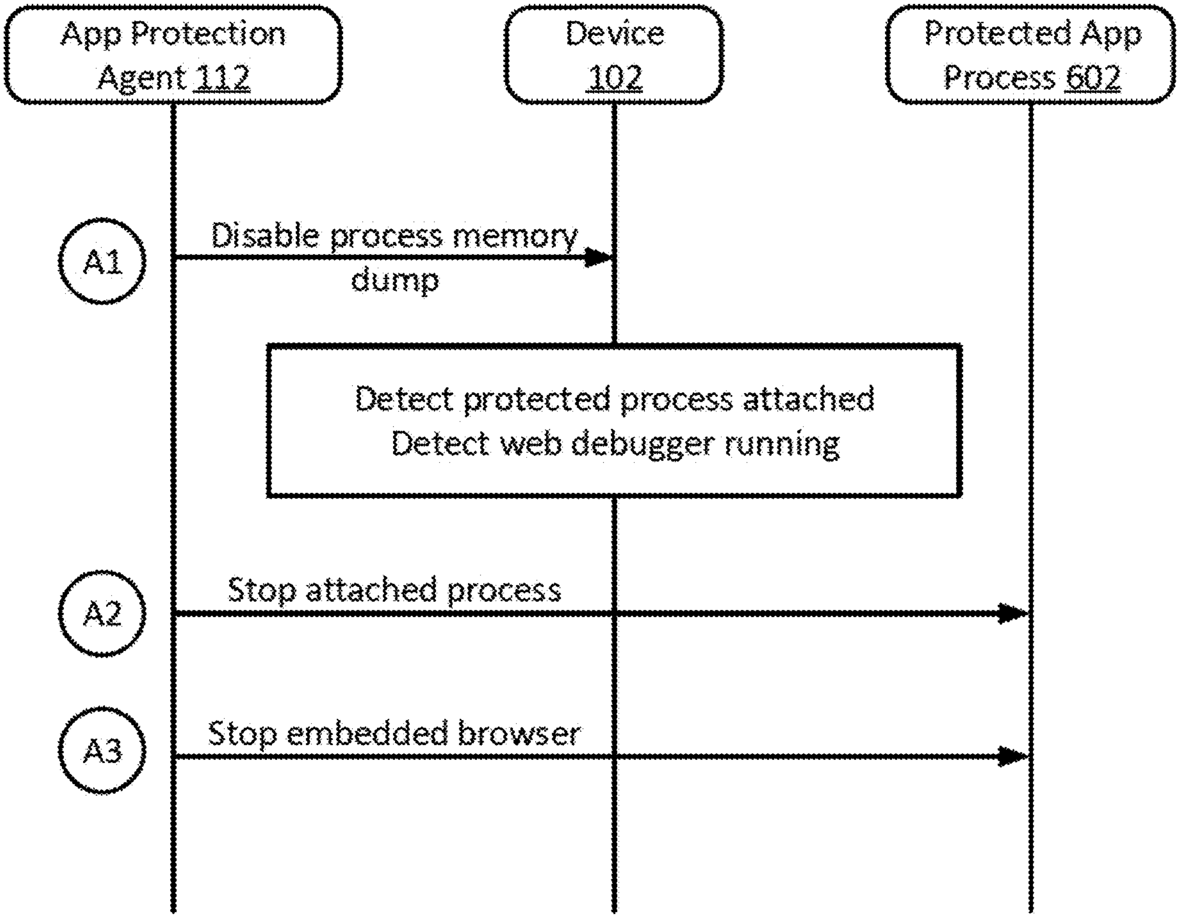
FIG. 6 is a flow diagram of another process for controlling access to a device, in accordance with an example of the present disclosure.

FIG. 6 is a flow diagram of another process for controlling access to a device, in accordance with an example of the present disclosure. As discussed above with respect to FIG. 5 when a protected application is not in use (e.g., when no user input is detected within a timeout threshold), the content generated by the protected application is removed or blanked from the GUI 114 of the computing device 102 so that the content is not visible to anyone viewing or otherwise accessing the computing device 102. In some examples, one or more additional actions can be taken to protect the content displayed on the GUI 114 and the computing device 102 from unauthorized access. For example, the application protection agent 112 can run in the background of the computing device 102 in an administrator mode or other mode that gives the application protection agent 112 privileges needed to carry out various tasks, such as disabling process memory dumps and stopping various processes. For example, once started, the application protection agent 112 disables the ability of the computing device 102 to dump memory of any process associated with the protected application(s), as indicated at step A1. If the computing device 102 detects that a protected application process 602, such as a debugging tool (e.g., WinDbg), is attached to, or attempting to attach to, the protected application(s), the application protection agent 112 causes the attached process 602 to stop, as indicated at step A2. If the computing device 102 detects that the process 602 is a web debugger (e.g., Fiddler) running in an embedded browser of the computing device 102 (e.g., a web-based software as a service (SaaS) process), the application protection agent 112 causes the process 602 of the embedded browser to stop, as indicated at step A3.

Figure 7:
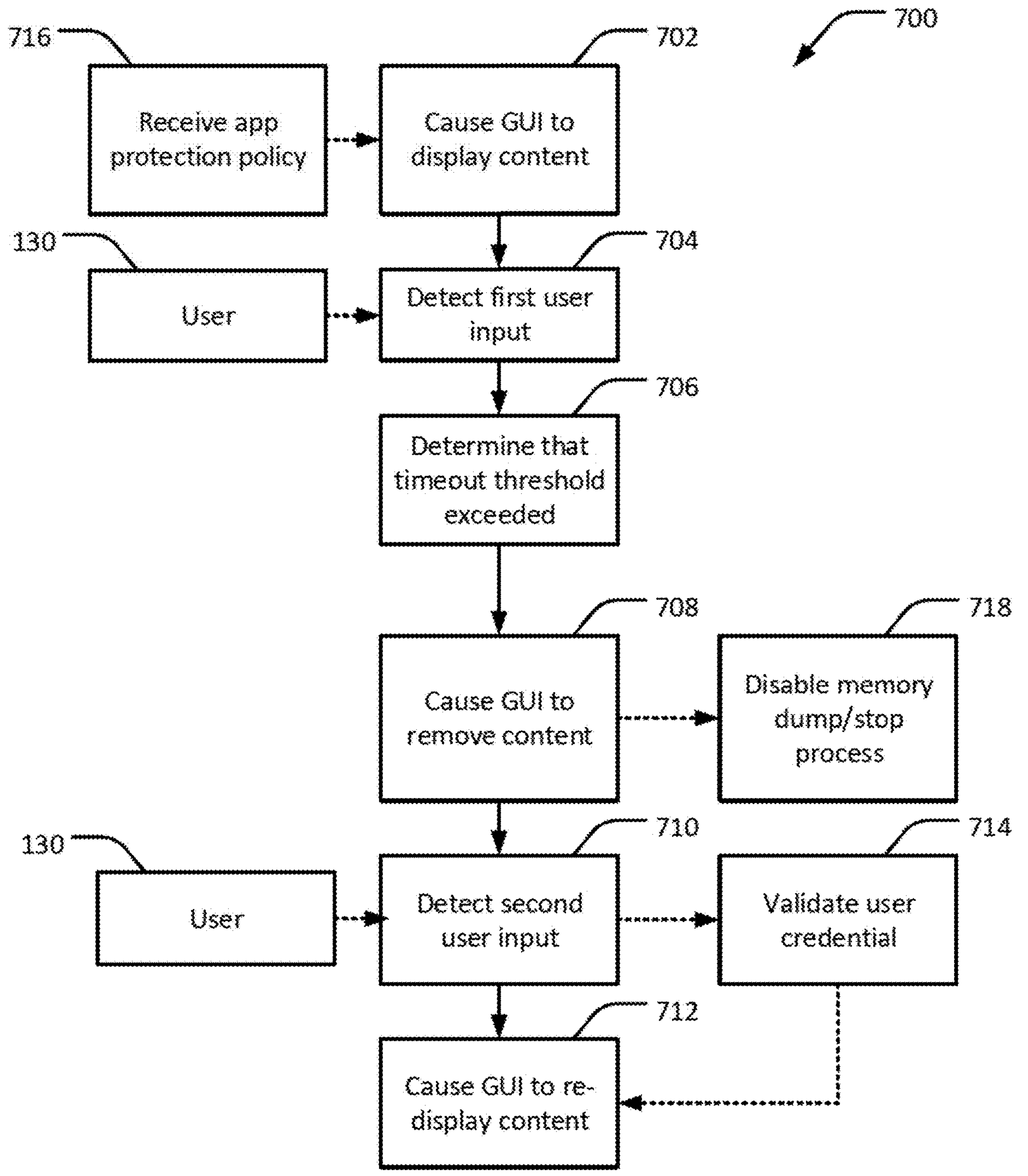
FIG. 7 is a flow diagram of yet another process of controlling access to a device, in accordance with an example of the present disclosure.

FIG. 7 is a flow diagram of a process 700 of controlling access to a device, in accordance with an example of the present disclosure. The process 700 can be implemented, for example, in the protected application client 110 of FIG. 1. The process 700 includes causing 702, by a processor, a graphical user interface (GUI) of the device (e.g., the GUI 114) to display content in an application window (e.g., the application window 202 or 204 of FIG. 2). The process 700 further includes detecting 704, by the processor, a first user input to the device, such as a keystroke or mouse action (click or movement) and determining 706, by the processor, that a timeout threshold has been exceeded based on the detected first user input. For example, if the timeout threshold is set to one minute, and if no user input is detected for at least one minute, then a determination is made that the timeout threshold has been exceeded.

The process 700 further includes causing 708, by the processor and in response to determining that the timeout threshold has been exceeded, the GUI to remove the content from the application window. For example, the application window 202 and/or 204 can be blanked out, such as shown in FIG. 3. The process 700 further includes detecting 710, by the processor, a second user input to the device. For example, the second user input can include a subsequent keystroke or mouse action, indicating that the user has resumed interacting with the device. The process 700 further includes causing 712, by the processor and in response to detecting the second user input, the GUI to display the content in the application window, such as shown in FIG. 2.

In some examples, the process 700 includes validating 714, by the processor, a user credential (e.g., a password or PIN) input to the device, such as shown in FIG. 4, and causing 712 the GUI to display the content in the application window in response to validating the user credential. It will be understood that the user credential is not always necessary but can be used to enhance security of the device by requiring a valid user credential before displaying the content in the application window. The validation can include, for example, matching the user credential proved by the user (input to the device) to a known and trusted credential. The validation can be performed, for example, by an operating system of the device, by a distinct identity and access management service, such as a multi-factor authentication service, by a cloud-based authentication service, or by any other suitable identity and access management system.

In some examples, the process 700 includes comprising receiving 716, from an access control service (e.g., the access control service 122 of FIG. 1), an application protection policy (e.g. the application protection policy 116 of FIG. 1) defining that the content is to be removed from the application window in response to determining that the timeout threshold has been exceeded. In some examples, the application protection policy can define which applications are to be protected by the policy, or the application protection policy can define that all applications are to be protected by the policy. In some examples, the process 700 further includes receiving, from the access control service, the timeout threshold associated with the application protection policy (e.g., a time after which the protected application is considered not in active use if no user input is received within the timeout threshold).

In some examples, the process 700 includes disabling 718, by the processor and responsive to determining that the timeout threshold has been exceeded, a memory dump of a process attached to the application window and/or stopping, by the processor, a process attached to the application window and/or a browser attached to the application window.

In some examples, the process 700 includes causing, by the processor, the GUI to display a second content in a second application window while removing a first content from a first application window. For example, if the application protection policy defines that the content generated by the first application should be removed or blanked while the first application is not in active use, but does not define a policy for the second application, the only the content generated by the first application will be removed or blanked from the GUI when the first application is not in active use, and the content generated by the second application will not be removed or blanked from the GUI when the second application is not in active use, such as shown in FIG. 3.

Example Computing Device

Figure 8:
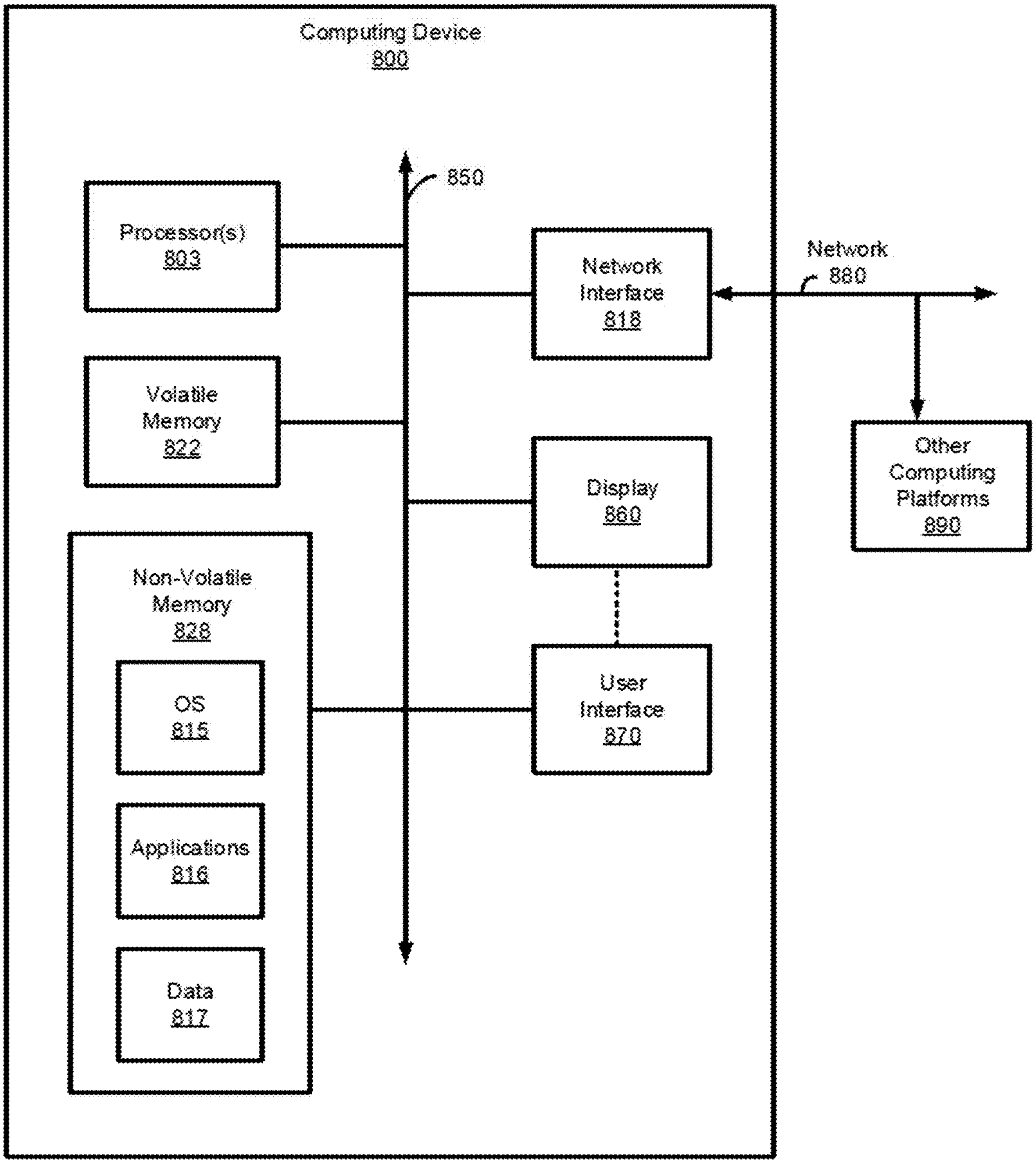
FIG. 8 is a block diagram of a computing device configured to implement various systems and processes in accordance with examples disclosed herein.

FIG. 8 is a block diagram of a computing device 800 configured to implement various systems and processes in accordance with examples disclosed herein. It will be understood that multiple computing devices 800 can be implemented according to the examples provided herein, where each of the computing devices 800 is configured to perform certain functions in conjunction with other computing devices 800. In some examples, the computing device 800 can include a workstation, a laptop computer, a tablet, a mobile device, or any suitable computing or communication device. One or more components of the computing device 800, including the computing device 102 and/or the server 104 of FIG. 1, can include or otherwise be executed using one or more processors 803, volatile memory (e.g., random access memory (RAM)) 822, non-volatile machine-readable mediums (e.g., a non-volatile memory 828), one or more network or communication interfaces 818, a display 860, a user interface (UI) 870, and a communications bus 850. The non-volatile (non-transitory) machine-readable mediums 828 can include: one or more hard disk drives (HDDs) or other magnetic or optical machine-readable storage media; one or more machine-readable solid state drives (SSDs), such as a flash drive or other solid-state storage media; one or more hybrid machine-readable magnetic and solid-state drives; and/or one or more virtual machine-readable storage volumes, such as a cloud storage, or a combination of such physical storage volumes and virtual storage volumes or arrays thereof. The user interface 870 can include one or more input/output (I/O) devices (e.g., a mouse, a keyboard, a touch screen/monitor/panel, a microphone, one or more speakers, etc.). The display 860 can provide a graphical user interface (GUI). The non-volatile memory 828 stores an operating system (OS), one or more applications, and data such that, for example, computer instructions of the operating system and the applications, are executed by processor(s) out of the volatile memory. In some examples, the volatile memory 822 can include one or more types of RAM and/or a cache memory that can offer a faster response time than the non-volatile memory 828. Data can be entered through the user interface 870. Various elements of the computing device 800 can communicate via the communications bus 850 or the network interface 818.

The computing device 800 can also be referred to as a client device, a computing device, a client computing device, an endpoint device, a computer, a computer system, or a server. The computing device 800 is shown as an example of the computing device 102 and/or the server 104 and can be implemented within any computing or processing environment with any type of physical or virtual machine or set of physical and virtual machines that can have suitable hardware and/or software capable of operating as described herein. In some examples, some components of the computing device can be implemented virtually (e.g., using a combination of hardware and software), such as to provide GUI 114 to the protected application client 110 of the computing device 102, where the protected application client 110 emulates certain processing functions of the computing device 102 (e.g., including at least portions of the method 700 of FIG. 7) using hardware components of the computing device 102 (e.g., processors, network communications hardware, I/O devices, etc.).

The non-volatile memory 828 stores an operating system (OS) 815, one or more applications or programs 816 (e.g., the protected application client 110, the application protection agent 112, etc.), and data 817 (e.g., the content generated by the protected application). The OS 815 and the applications 816 include sequences of instructions that are encoded for execution by processor(s) 803. Execution of these instructions results in manipulated data. Prior to their execution, the instructions can be copied to the volatile memory 822. In some examples, the volatile memory 822 can include one or more types of RAM and/or a cache memory that can offer a faster response time than a main memory. Data can be entered through the user interface 870 (e.g., the GUI 114) or received from the other I/O device(s), such as the network interface 818. The various elements of the computing device 800 described above can communicate with one another via the communications bus 850 and/or via the network interface 818 to other computing platforms 890.

The processor(s) 803 can be implemented by one or more programmable processors to execute one or more executable instructions, such as a computer program, to perform the functions of the system. As used herein, the term "processor" describes circuitry or hardware that performs a function, an operation, or a sequence of operations. The function, operation, or sequence of operations can be hard coded into the circuitry or a data storage device, or soft coded by way of instructions held in the storage device and executed by the circuitry. A processor can perform the function, operation, or sequence of operations using digital values and/or using analog signals. In some examples, the processor can include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The processor(s) 803 can be analog, digital, or a combination of these. In some examples, the processor(s) 803 can be one or more local physical processors or one or more remotely located physical processors. A processor including multiple processor cores and/or multiple processors can provide functionality for parallel, simultaneous execution of instructions or for parallel, simultaneous execution of one instruction on more than one piece of data.

The network interfaces 818 can include one or more interfaces to enable the computing device 800 to access a computer network 880 such as a Local Area Network (LAN), a Wide Area Network (WAN), a Personal Area Network (PAN), or the Internet through a variety of wired and/or wireless connections, including cellular connections and Bluetooth connections. In some examples, the network 880 may allow for communication with other computing devices 890, such as the computing device 102 and/or the server 104, to enable distributed, shared, or cooperative computing (e.g., such as cooperatively functioning to display to, and remove or blank content from, the application window(s) 202, 204). The network 880 can include, for example, one or more private and/or public networks over which computing devices can exchange data.

In described examples, the computing device 800 can execute an application on behalf of a user (e.g., the user 130) of the computing device 102. For example, the computing device 800 can execute one or more virtual machines managed by a hypervisor. Each virtual machine can provide an execution session within which applications execute on behalf of a user or a client device, such as a hosted desktop session. The computing device 800 can also execute a terminal services session to provide a hosted desktop environment. The computing device 800 can provide access to a remote computing environment including one or more applications, one or more desktop applications, and one or more desktop sessions in which one or more applications can execute.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of the present disclosure as set forth in the claims. For example, the processes disclosed herein each represent a sequence of acts in a particular example. Some acts are optional and, as such, can be omitted in accord with one or more examples. Additionally, the order of acts can be altered, or other acts can be added, without departing from the scope of the apparatus and methods discussed herein.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method of controlling access to a device, the method comprising:

causing, by a processor, a graphical user interface (GUI) of the device to display content in an application window;

detecting, by the processor, a first user input to the device;

determining, by the processor, that a timeout threshold has been exceeded based on the detected first user input;

causing, by the processor and in response to determining that the timeout threshold has been exceeded, the GUI to remove the content from the application window;

detecting, by the processor, a second user input to the device;

causing, by the processor and in response to detecting the second user input, the GUI to display the content in the application window; and disabling, by the processor and responsive to determining that the timeout threshold has been exceeded, a memory dump of a process attached to the application window.

2. The method of claim 1, further comprising validating, by the processor, a user credential input to the device, wherein causing the GUI to display the content in the application window is further responsive to validating the user credential.

3. The method of claim 1, further comprising receiving, from an access control service, an application protection policy defining that the content is to be removed from the application window in response to determining that the timeout threshold has been exceeded.

4. The method of claim 3, further comprising receiving, from the access control service, the timeout threshold associated with the application protection policy.

5. The method of claim 1, further comprising stopping, by the processor, a process attached to the application window and/or a browser attached to the application window.

6. The method of claim 1, wherein the content is a first content, wherein the application window is a first application window, and wherein the method further comprises causing, by the processor, the GUI to display a second content in a second application window while removing the first content from the first application window.

7. A computer program product including one or more non-transitory machine readable mediums having instructions encoded thereon that when executed by at least one processor cause a process to control access to a device to be carried out, the process comprising:

causing a graphical user interface (GUI) of the device to display content in an application window;

detecting a first user input to the device;

determining that a timeout threshold has been exceeded based on the detected first user input;

causing, responsive to determining that the timeout threshold has been exceeded, the GUI to remove the content from the application window;

detecting a second user input to the device;

causing, responsive to detecting the second user input, the GUI to display the content in the application window; and disabling, responsive to determining that the timeout threshold has been exceeded, a memory dump of a process attached to the application window.

8. The computer program product of claim 7, wherein the process further comprises validating a user credential input to the device, wherein causing the GUI to display the content in the application window is further responsive to validating the user credential.

9. The computer program product of claim 7, wherein the process further comprises receiving, from an access control service, an application protection policy defining that the content is to be removed from the application window responsive to determining that the timeout threshold has been exceeded.

10. The computer program product of claim 9, wherein the process further comprises receiving, from the access control service, the timeout threshold associated with the application protection policy.

11. The computer program product of claim 7, wherein the process further comprises stopping a process attached to the application window and/or a browser attached to the application window.

12. The computer program product of claim 7, wherein the content is a first content, wherein the application window is a first application window, and wherein the process further comprises causing the GUI to display a second content in the second application window while removing the first content from the first application window.

13. A system comprising:

a storage; and at least one processor operatively coupled to the storage, the at least one processor configured to execute instructions stored in the storage that when executed cause the at least one processor to carry out a process comprising causing a graphical user interface (GUI) of the device to display content in an application window;

detecting a first user input to the device;

determining that a timeout threshold has been exceeded based on the detected first user input;

causing, responsive to determining that the timeout threshold has been exceeded, the GUI to remove the content from the application window;

detecting a second user input to the device;

causing, responsive to detecting the second user input, the GUI to display the content in the application window; and disabling, responsive to determining that the timeout threshold has been exceeded, a memory dump of a process attached to the application window.

14. The system of claim 13, wherein the process further comprises validating a user credential input to the device, wherein causing the GUI to display the content in the application window is further responsive to validating the user credential.

15. The system of claim 13, wherein the process further comprises receiving, from an access control service, an application protection policy defining that the content is to be removed from the application window responsive to determining that the timeout threshold has been exceeded.

16. The system of claim 15, wherein the process further comprises receiving, from the access control service, the timeout threshold associated with the application protection policy.

17. The system of claim 13, wherein the process further comprises stopping a process attached to the application window and/or a browser attached to the application window.

* * * * *